Figure 1:
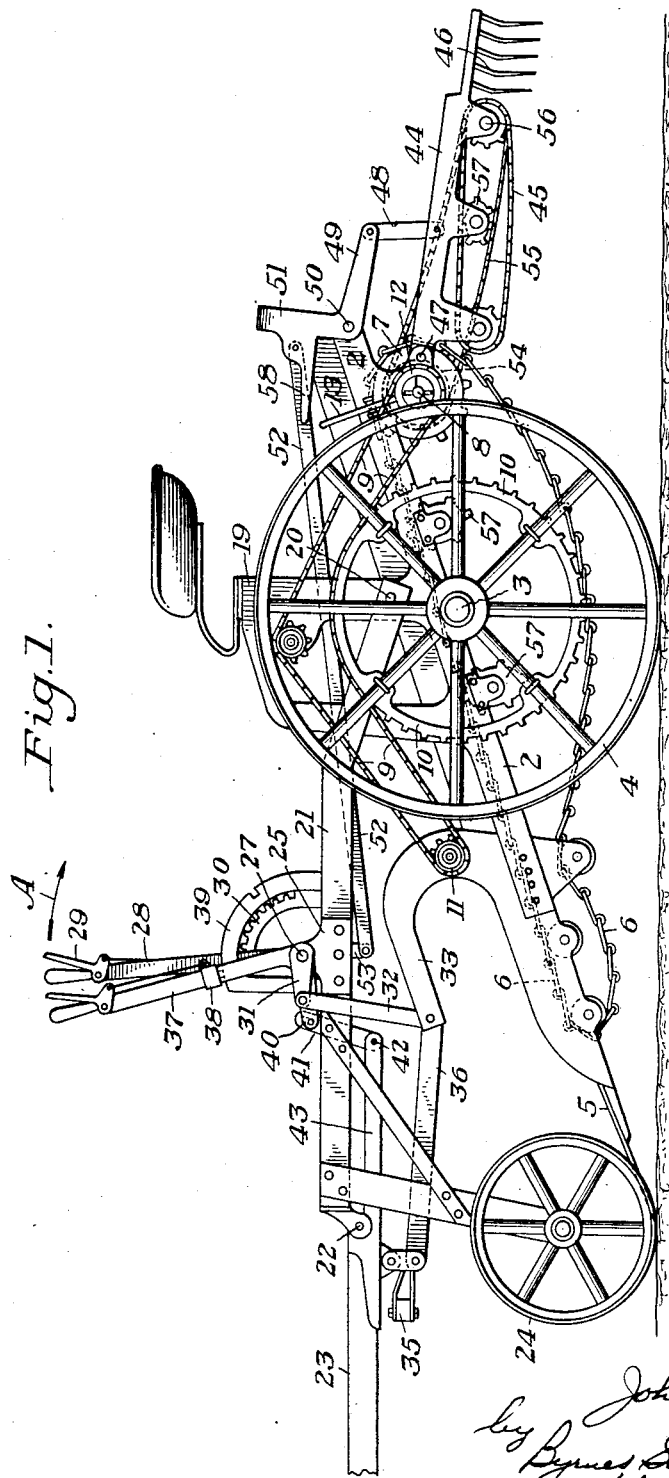

May 28, 1929.  J. HIST  1,715,198
POTATO DIGGER
Filed Oct. 29, 1927  3 Sheets-Sheet 1

INVENTOR
John Hist

May 28, 1929.　　　　J. HIST　　　1,715,198
POTATO DIGGER
Filed Oct. 29, 1927　　　3 Sheets-Sheet 2
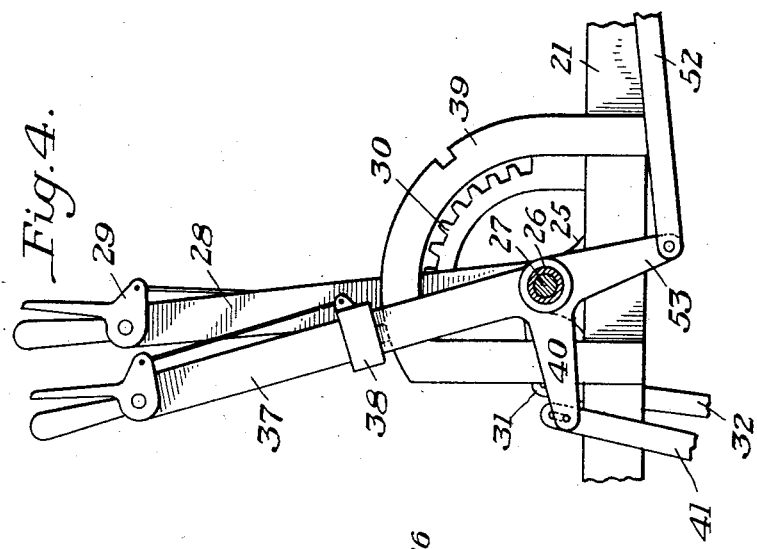
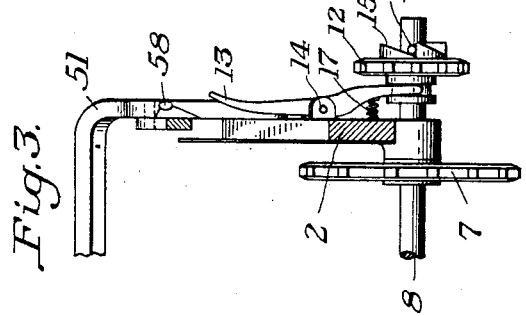
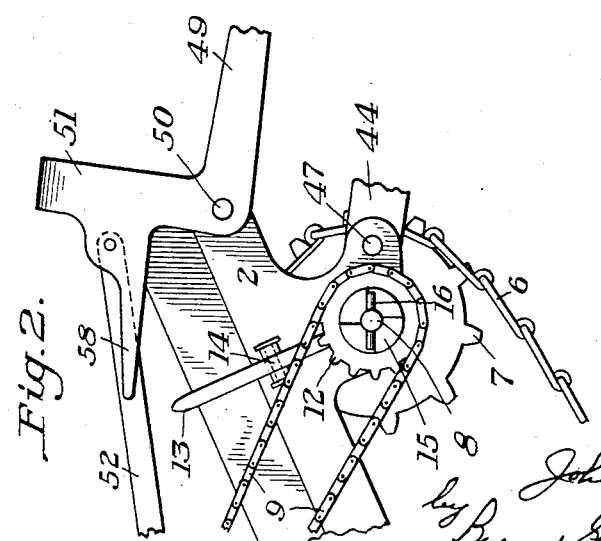
INVENTOR
John Hist
by Byrnes, Stebbins & Harmeler
his attorneys May 28, 1929.   J. HIST   1,715,198
POTATO DIGGER
Filed Oct. 29, 1927   3 Sheets-Sheet 3

INVENTOR
John Hist
By Byrne, Stebbins & Harnden
his attorneys

Patented May 28, 1929.

1,715,198

UNITED STATES PATENT OFFICE.

JOHN HIST, OF CLEVELAND, OHIO, ASSIGNOR TO THE CLEVELAND IMPLEMENT MANUFACTURING COMPANY, OF CLEVELAND, OHIO, A CORPORATION OF OHIO.

POTATO DIGGER.

Application filed October 29, 1927. Serial No. 229,551.

The present invention relates broadly to harvesting machines and more particularly to potato diggers.

It has heretofore been customary to provide potato diggers with a plurality of separate levers adapted to control different operations. The present invention has for one of its objects the simplification of such constructions and the arrangement of parts whereby the mechanism may be more easily operated.

This application is a continuation in part of my copending application Serial No. 737,280, filed September 12, 1924.

In the accompanying drawings there are illustrated certain present preferred embodiments of the invention, but it will be apparent that changes may be made in the construction and operation of the mechanism disclosed therein without departing from the spirit of the invention or scope of my broader claims.

Figure 5:
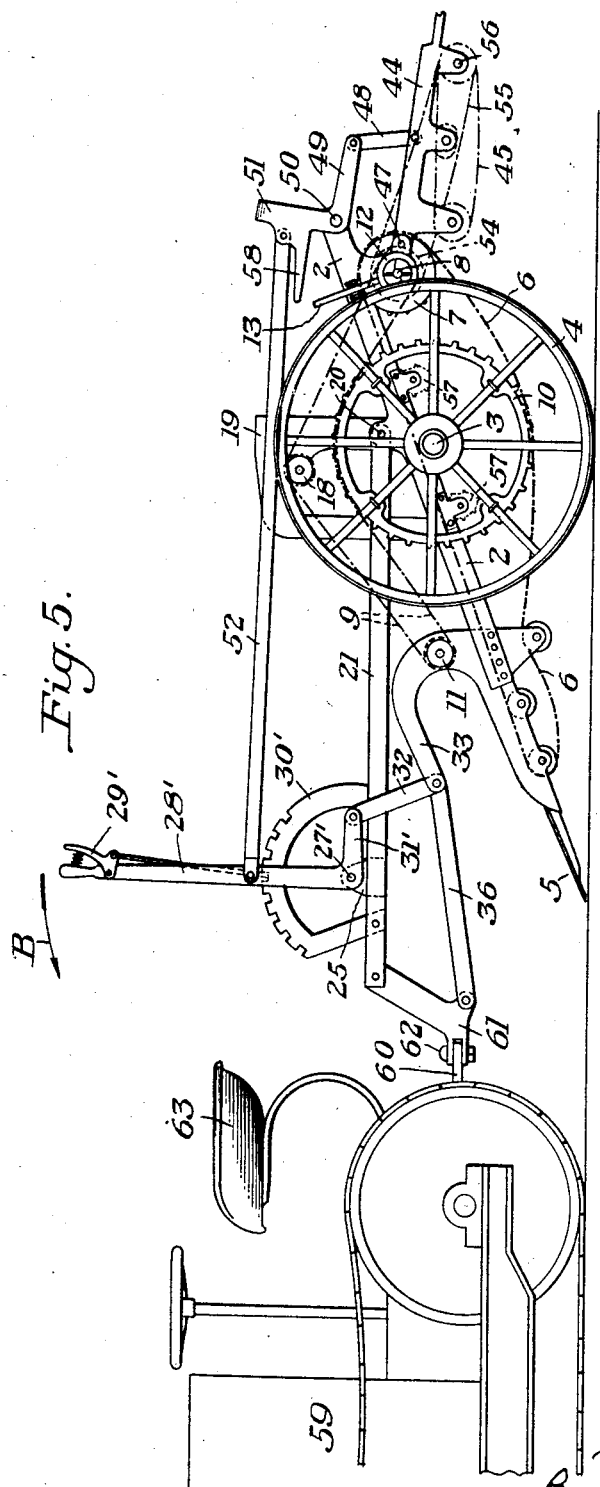

In the drawings,

Figure 1 is a side elevation of a portion of a potato digger constructed in accordance with the present invention, Figures 2, 3 and 4 are detail views on an enlarged scale of different portions of the mechanism, and Figure 5 is a view similar to Figure 1, but with certain parts omitted for the sake of clearness, of a modified form of potato digger.

Referring more particularly to the drawings, there is illustrated in Figure 1 one form of potato digger especially adapted to be horse drawn and comprising a main frame 2 pivotally connected in any desired manner to the transversely extending axle 3 carrying main supporting and driving wheels 4 on the opposite ends thereof. Mounted on the forward end of the main frame 2 is a shovel or plow 5 adapted to dig the potatoes from the ground and deliver the same together with the vines and adhering dirt to a main elevator web 6, of any desired construction, which may be carried by the frame 2. At its rear end the elevator passes over sprockets 7 secured adjacent opposite ends of a main drive shaft 8 extending transversely of the main frame 2 and supported thereby in any desired manner. For driving the shaft 8 there may be provided on each side of the machine a main drive chain 9 each cooperating at its intermediate portion with a main drive sprocket 10. These sprockets 10 are in turn secured in any desired manner to the wheels 4 so as to be driven in unison therewith. At one end the main drive chain passes over an idler sprocket 11, while at the other end it cooperates with a clutch sprocket wheel 12, illustrated in detail in Figures 2 and 3. Cooperating with the clutch sprocket wheel 12 is an operating lever 13 having a pivotal connection 14 at an intermediate portion thereof with the main frame 2. The lever 13 is normally urged outwardly to engage the clutch 15 thereof, and which is adapted to be moved axially of the shaft 8, with a pin 16 extending through the main drive shaft 8 by means of a spring 17. With the clutch sprocket wheel in the position illustrated in Figure 3, it will be apparent that rotation will be imparted to the shaft 8 by the main drive chain 9 as the digger is moved forwardly over the ground. This movement will in turn be effective for causing the elevator 6 to operate as required. The amount of slack in the main drive chain 9 may be regulated at will by adjusting the idler sprocket 18 in the frame 19 projecting upwardly from the main frame 2.

Pivotally connected to the frame 19, as indicated at 20, is an upper frame 21 extending forwardly of the machine and having a pivotal connection 22 with the pole 23. The forward end of the frame 21 is adapted to be supported by gauge wheels 24 carried thereby in any desired manner.

The upper frame 21 is also provided with brackets 25 to rotatably receive a tubular shaft 26 extending transversely of the frame 21 and having rotatably mounted therein a second shaft 27. For operating the shaft 27 I have provided a lever 28 having locking means 29 of well known construction adapted to cooperate with the quadrant 30 for holding the lever in adjusted position. Secured in any desired manner to opposite ends of the shaft 27 are crank arms 31 pivotally connected to links 32 which in turn have their lower ends pivotally connected to the goose neck 33. By moving the lever 28 in the direction of the arrow A of Figure 1, it will be apparent that the shaft 27 will be rotated in a clockwise direction as viewed in this figure, thereby lifting the shovel 5 with respect to the gauge wheels 24. Draft for moving the digger may be transmitted to goose neck 33 from the eveners 35 by means of draft bars 36.

Secured to the tubular shaft 26 is a tilting lever 37 having locking means 38 adapted to cooperate with suitably arranged notches in the quadrant 39 carried by the upper frame 21. Projecting forwardly from the tubular shaft 26 is a crank arm 40 having its forward end operatively connected with a link 41, the lower end of which has a pivotal connection 42 with the rear end 43 of the pole 23. By reason of this construction, it will be obvious that if the tilting lever 37 is moved in the direction of the arrow A it will tend to raise the rear end 43 of the pole. This in turn will tend to lower the front end of the pole, but as this end of the pole will be held in predetermined position by the usual neck yoke, not shown, the gauge wheels 24 will be lifted bodily from the ground, and the main frame 2 will be tilted about the axle 3 and the pivotal connection.

At the rear end of the main frame 2 there is provided a second elevator frame 44 having a smaller elevator 45 adapted to receive material as discharged from the elevator 6 and deliver the same to gathering forks 46 from which such material will be in turn deposited on the ground with all of the dirt removed therefrom. The frame 44 has a pivotal connection 47 with the main frame 2, and is held in operating position by a link 48 pivotally connected at its lower end to said frame and at its upper end to the arm 49 of a bell crank lever having a pivotal connection 50 with the main frame 2. The arm 51 of this bell crank lever is in turn connected by a link 52 with the depending arm 53 of the tilting lever 37. Due to this construction, as the tilting lever is moved as before described to raise the gauge wheels 24 from the ground, the outer end of the second elevator frame 44 will in turn be swung upwardly into such position that the entire machine will rest on the main drive wheels 4 and may be safely transported from place to place thereon.

The elevator 45 may be operated from the main drive shaft 8 by providing a sprocket 54 thereon adapted to drive the second drive chain 55 which passes around a suitable sprocket on the shaft 56. Both the main elevator 6 and the second elevator 45 are adapted to be vibrated during the travel thereof by eccentric toothed members 57 meshing therewith and driven thereby as will be clearly understood. For throwing the clutch sprocket wheel 12 to inoperative position simultaneously with the operation of the tilting lever 37, the arm 51 of the bell crank lever is provided with a forwardly extending arm 58 adapted to engage the end of lever 13 and move the same against the action of the spring 17 to disengage the clutch 15 from the pin 16. In this manner all of the parts of the machine may be moved to inoperative position, and both elevators may be rendered inoperative at the same time by the movement of a single lever. This considerably simplifies both the operation and construction of the digger, and constitutes an important feature of the present invention. When it is desired to again place the parts in operative position the tilting lever 37 may be returned to the position illustrated in Figure 1, whereupon the arm 58 will move away from the lever 13 and permit the spring 17 to return the clutch sprocket wheel to operative position. This will place the elevators in operation simultaneously with the lowering of the front end of the main frame 2 and the back end of the elevator frame 44.

In Figure 5 of the drawings is shown a modified form of the invention which is especially adapted to be drawn by a tractor. In this form of the invention the front end of the digger is rigidly supported upon the tractor draw bar, thus doing away with the necessity of providing gauge wheels. In Figure 5 a tractor is diagrammatically represented at 59 and is provided with the usual draw bar 60 and driver's seat 63. The parts of the digger corresponding to those of the form shown in Figure 1 are correspondingly numbered.

The gauge means adapted to cooperate with the tractor draw bar comprises a yoke 61, the arms of which are provided with coaxial holes through which a bolt 62 or other connecting means is adapted to be inserted, such connecting means also passing through a hole provided in the draw bar. Thus the yoke 61 is rigidly supported by the draw bar at all times.

In the modified construction there is journalled in the brackets 25 a single shaft 27' and mounted upon this shaft is an operating lever 28'. The operating lever is provided with the usual locking means 29' cooperating with quadrant 30' for holding the lever in adjusted position. Secured to the shaft 27' are crank arms 31' to the ends of which are pivoted the links 32. Also pivoted to the lever 28' is the link 52. The links 32 and 52 serve exactly the same function as such links in the embodiment of the invention shown in Figure 1.

It will thus be seen that when a tractor or other similar motive unit having a fixed draw bar is used, the front end of the digger is at all times supported upon the draw bar and there is no occasion for the gauge wheels 24 or for any mechanism for lifting the gauge wheels from the ground. The single lever 28' is, therefore, sufficient to raise both the front end of the main frame 2, and consequently the shovel 5, and simultaneously to lift the rear end of the elevator frame 44. It will be understood that operation of the lever 28' to move the frames about their respective pivots also causes disengagement of the driving means in precisely the same manner as operation of the lever 37 of Figure 1.

As the operator is seated upon the seat 63 of the tractor, the lever 28' is disposed to operate forwardly, or in the direction of the arrow B of Figure 5, to move the frames about their respective pivots and to cause disengagement of the driving means. By this arrangement the driver by turning slightly in the seat may easily operate the lever.

By the arrangements disclosed herein I obtain the advantageous operation referred to thereby materially improving constructions as heretofore used.

I claim:

1. In a potato digger, a main elevator frame having a shovel secured to the front end thereof, a supporting axle pivotally carrying said frame, a second elevator frame pivotally secured to said main frame, an upper frame pivoted at its rear end to the main elevator frame and carrying a gauge wheel at its forward end, an elevator carried by each of said elevator frames, means for driving said elevators, an operating means carried by said upper frame for swinging the main frame about said supporting axle to raise and lower said shovel, and a second operating means carried by said upper frame for simultaneously raising the front end of the upper frame and the rear end of the second elevator frame and rendering said driving means inoperative.

2. In a potato digger, a main frame carrying a shovel, supporting wheels for said frame, an upper frame pivoted to the main frame, gauge wheels on the upper frame, a pole pivotally connected to the upper frame, an endless elevator on the main frame, a shaft carried by the main frame, driving connections between said shaft and the supporting wheels, a second elevator frame pivotally connected to the main frame, an endless conveyor on said second elevator frame, driving connections between said second conveyor and said shaft, means on the upper frame for raising the main frame to an inoperative position, and a second means on the upper frame for simultaneously raising the front end thereof together with the gauge wheels, and the rear end of the pole, and for raising the auxiliary frame and simultaneously disconnecting the driving connections between the shaft and the supporting wheels.

3. In a potato digger, a main elevator frame, supporting wheels therefor, a second elevator frame pivotally connected to said main elevator frame, an elevator carried by each of said elevator frames, a transverse shaft carried by the main frame, driving connections between said shaft and the supporting wheels, driving connections between said shaft and each of the elevators, a clutch on said shaft comprising at least one element adapted to be moved axially thereof, and means for raising the second elevator frame and for simultaneously moving said element axially of the shaft for disconnecting the clutch from the driving connections to the supporting wheels.

4. A potato digger having a main frame, supporting wheels for the main frame, a plow on the front end of the main frame, an upper frame pivotally connected adjacent its rear end to the main frame, a pole pivotally connected adjacent the front end of the upper frame, gauge wheels on the upper frame adapted to rest on the ground when the digger is in operation, an elevator frame pivotally connected to the main frame and extending rearwardly thereof, an elevator on said elevator frame, driving connections between the elevator and the supporting wheels, means on the upper frame for simultaneously raising the front end of the upper frame and the rear end of the pole, and for raising the gauge wheels from the ground and disconnecting the driving connections to the elevator, said last mentioned means also including means for rigidly locking the pole and upper frame to each other and for holding the driving connections disconnected.

5. In a potato digger, a main elevator frame carrying a shovel, a pivotal support for the main elevator frame, a second elevator frame pivoted to the main elevator frame, an operating frame carrying gauge means at its forward end, an elevator carried by each of the elevator frames, means for driving the elevators, and an operating means carried by the operating frame for simultaneously raising the front end of the main elevator frame and the rear end of the second elevator frame and rendering the driving means inoperative.

6. In a potato digger, a main elevator frame carrying a shovel, a pivotal support for the main elevator frame, a second elevator frame pivoted to the main elevator frame, an operating frame carrying gauge means at its forward end, an elevator carried by each of the elevator frames, means for driving the elevators, and an operating means carried by the operating frame for simultaneously raising the shovel and one end of the second elevator frame and rendering the driving means inoperative.

In testimony whereof I have hereunto set my hand.

JOHN HIST.